United States Patent
Patch et al.

(10) Patent No.: US 8,856,171 B2
(45) Date of Patent: Oct. 7, 2014

(54) LOCATING AND EXECUTING OBJECTS IN A DISTRIBUTED NETWORK

(75) Inventors: Ray Patch, Redmond, WA (US); Liviu Tiganus, Sammamish, WA (US); Rajeev Chauhan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 5 days.

(21) Appl. No.: 13/074,260

(22) Filed: Mar. 29, 2011

(65) Prior Publication Data

US 2012/0254239 A1 Oct. 4, 2012

(51) Int. Cl.
*G06F 17/30* (2006.01)
*G06F 9/54* (2006.01)

(52) U.S. Cl.
CPC ................................... *G06F 9/548* (2013.01)
USPC ........................................ 707/770; 719/330

(58) Field of Classification Search
USPC ........................................ 707/770; 719/330
See application file for complete search history.

(56) References Cited

U.S. PATENT DOCUMENTS

| | | | |
|---|---|---|---|
| 6,636,900 B2 | 10/2003 | Abdelnur | |
| 6,957,436 B1 | 10/2005 | Mihic | |
| 7,039,920 B2 | 5/2006 | Wall | |
| 7,200,530 B2 | 4/2007 | Brown | |
| 7,213,236 B2 | 5/2007 | Gibbons | |
| 7,222,152 B1 | 5/2007 | Thompson et al. | |
| 8,060,864 B1* | 11/2011 | Michelsen | 717/126 |
| 2004/0199486 A1* | 10/2004 | Gopinath et al. | 707/1 |
| 2006/0031282 A1* | 2/2006 | Tuttle et al. | 709/203 |
| 2006/0085498 A1 | 4/2006 | Matsushima | |
| 2006/0136564 A1 | 6/2006 | Ambrose | |
| 2006/0212531 A1* | 9/2006 | Kikkawa et al. | 709/217 |

OTHER PUBLICATIONS

Krzysztof Jan Ostrowski, Ph.D. "Live Distributed Objects", Cornell University 2008.*
"Design and performance of a modular portable Object Adapter for Distributed, Real-time, and Embedded CORRA Applications", Raymond et al. Jun. 29, 2002 (hereafter Raymond).*
Roland Schwarzkopf, et al., Java RMI versus .NET Remoting Architectural Comparison and Performance Evaluation, 2008.
Maarten Van Steen, et al.; A Wide-Area Distributed System, 2002.
Paddy Srinivasan; An Introduction to Microsoft .Net Remoting Framework, 2001.
Java Distributed Object Model; Dec. 16, 2010.
Robert Van Engelen, et al., Toward Remote Object Coherence with Compiled Object Serialization for Distributed Computing with XML Web Services, Dec. 16, 2010.
International Search Report and Written Opinion received for PCT Application No. PCT/US2012/029318, mailed on Oct. 30, 2012, 9 pages.

* cited by examiner

*Primary Examiner* — Apu Mofiz
*Assistant Examiner* — Cindy Nguyen
(74) *Attorney, Agent, or Firm* — Steve Wight; David Andrews; Micky Minhas

(57) ABSTRACT

The subject disclosure relates to interaction and execution of objects in a distributed network or in the cloud. Each object comprises a Uniform Resource Identifier (URI) path that names the object in the cloud through a distributed object directory. A client device can directly interface with a live instance of an object based on the URI path. The object can be agnostic to remote procedure call semantics. In some aspects, the object can be connected to an interacted with either remotely or locally. Further, single instances or multiple instances of the object can exist at substantially the same time.

20 Claims, 12 Drawing Sheets

LOCATING AND EXECUTING OBJECTS IN A DISTRIBUTED NETWORK

TECHNICAL FIELD

The subject disclosure generally relates to interacting with live objects and in particular to locating and executing objects in a distributed network.

BACKGROUND

As computing technology advances and computing devices become more prevalent, computer programming techniques have adapted for the wide variety of computing devices in use. Such computing devices can be utilized in a distributed network, wherein computer programming and data is distributed (or spread out) over more than one computing device. Further, the computing devices can be utilized to interact with other devices and/or systems over the distributed network. As a cost efficient mechanism, client/server computing can be utilized where the client device has a first set of capabilities and the server (or other devices within the distributed network) provide a second set of capabilities.

In this regard, software objects can run instances of a distributed protocol. Software objects (or simply "objects") comprise properties and methods or behaviors, which are a set of possible external interaction patterns with which proxies of the objects can engage in the local runtime environments. Conventionally, an object is stored in a data store, such as a database, and the data or code for the object is stored in a shared library in which the object was compiled. When the object is to be utilized, the object is loaded locally (e.g., on the client device) and executed. However, with such conventional systems, the object is aware of and understands remote procedures, which can make programming of such objects not only time consuming, but also very detail oriented.

Consequently, conventional systems fail to properly support software objects that are not aware of remote procures. Further, there is no system today that allows software objects to reside in a distributed network to achieve distributed support of such objects.

The above-described deficiencies of today's computing system and object execution system techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, provided is a simple mechanism for developers to persist objects and read back (or execute) the object. Further, the object can be accessed locally and/or remotely. For example, the disclosed embodiments allow for reading and writing objects in a distributed directory. Thus, the objects can be connected to and can be interacted with either remotely and/or locally.

In addition, methods can be executed on running instances in the network or in the cloud. The object implementation can be unaware of the details of the hosting environment. Further, the object implementation can be unaware of remote process calls and/or remote procedure call (RPC) semantics.

There can be single instances or multiple instances of the same object existing at substantially the same time. Furthermore, each object, whether running or not running, has a Uniform Resource Identifier (URI) path that names the object in the cloud through a distributed object directory.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
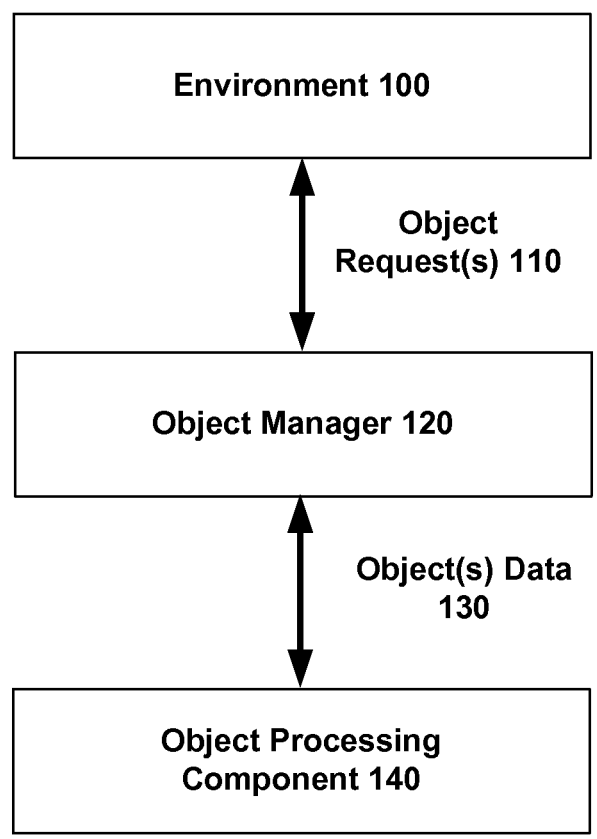
FIG. 1 illustrates a block diagram of an exemplary computing system, according to an aspect.

There are various types of objects that can be configured to serve as remote objects. Such objects include, for example, .NET remote objects that can include a single call object, a singleton object, and a client-activated object. A single call object services only one incoming request and does not retain state information. A singleton object services multiple clients and can share data by storing state information between client invocations. A client-activated object is a server-side object that can be activated upon a client request. As utilized herein a user, end-user, client, client device, entity, or the like, can refer to a human, an actor, a computer, the Internet, a system (or another system), a commercial enterprise, a machine, machinery, and so forth, and hereinafter will be commonly referred to as user, client, or client device, depending on the context.

Conventionally, when objects are to be utilized, a user generally installs the object locally (e.g., on the client device). Therefore, the object is developed or created in such a manner that the object is aware of and understands complex remote procedures. Development of such remote procedure aware objects can be time consuming and generally utilizes a highly skilled developer that has the technical skills to create objects that have the capability of performing the complex remote procedures. The utilization of such highly skilled developers increases costs as well as the complexity of the object itself.

Thus, it would be beneficial to develop objects that can operate as intended without being aware of complex remote procedures. Further, it would be beneficial to develop objects that can be applied within a distributed network, which can increase the usability of such objects.

In an embodiment, the disclosed aspects are related to software objects that live in a network and can be directly accessed over the network. Data associated with the object can be read and written, and the object's methods can be executed. Such reading, writing, and execution can be performed without loading the object into the local host's address space. In some embodiments, methods can be executed on an object located in a distributed connected network or "in the cloud". Unlike other forms of remote method calls and/or object activation, the disclosed aspects allow a developer to create objects without being concerned with remote procedure call semantics, implementing special interfaces, or even the location in the cloud where the object instance is running and/or hosted.

The disclosed aspects allow objects to be located in the network at a path using a relative or absolute Uniform Resource Identifier (URI). This path allows the caller (e.g., client device) to access the object remotely and to interact with the object's properties (e.g., data) or to invoke the object's methods (e.g., code) in a uniform and consistent manner. Thus, the disclosed aspects allow a developer to create objects and place the objects into the network. The developer (or another user) can interact with the objects either locally (in the client's address space) or remotely (in the server's address space).

In one embodiment, a system includes an object manager component configured to access an object based on a request for a Uniform Resource Identifier (URI) path received from a client device. The URI is a relative URI or an absolute URI. The system also includes an object processing component configured to interact remotely with the object. The object is agnostic to remote procedures.

In some implementations, the object manager component is configured to connect to a live instance of the object. In other implementations, the object processing component is configured to receive real-time feedback of a condition of the object. According to some implementations, the object processing component is configured to indirectly interact with at least a second object that performs at least one function on behalf of the object.

In an implementation, the object is configured to offload at least a portion of its functionality to a distributed object. The object processing component is unaware of an existence of the distributed object. In further implementations, the object processing component is configured to interact with the object anonymously.

In some implementations, the system further comprises an abstraction layer configured to communicate with the client device on behalf of the object and to communicate with the object on behalf of the client device. In another embodiment, a method includes writing an object to a web-service and saving the object in a database associated with the web-service. The method also includes executing the object based on receipt of a request directed to a Uniform Resource Identifier (URI).

In an implementation, the saving the object comprises assigning the URI to the object, wherein the URI is universal. In some implementations, the executing is based on the request from a first device. In this implementation, the method further includes ascertaining the first device has disconnected from the object and saving a first version of the object. The method also includes receiving a second request from the first device or a second device and executing the first version of the object as a function of the second request.

In another implementation, the method includes processing at least one change to the object. The request and the at least one change are received from a first device. The method also includes automatically saving the at least one change in the database associated with the web-service.

In a further implementation, the method includes receiving a second request from a second device and presenting the object with the at least one change to the second device. In some implementations, the executing comprises interacting with at least a second object, wherein the second object is associated with the object.

In another embodiment, a method for distributed execution of an object includes receiving a call for the object. The object comprises a first sub-object and a second sub-object. The method also includes executing at least one of the object, the first sub-object, and the second sub-object as a function of the call, wherein the execution is performed in the cloud.

In an implementation, the executing comprising moving at least a portion of the object during execution. In another implementation, the executing comprises executing the first sub-object in a first machine and executing the second sub-object in a second machine. In a further implementation, the executing comprises offloading at least one function of the object to the first sub-object or the second sub-object.

In some implementations, the method includes monitoring use of the object, the first sub-object, and the second sub-object and offloading functionality of at least one of the object, the first sub-object, and the second sub-object based on the monitoring.

Herein, an overview of some of the embodiments for object execution systems has been presented above. As a roadmap for what follows next, various exemplary, non-limiting embodiments and features for object execution systems are described in more detail. Then, some non-limiting implementations and examples are given for additional illustration, followed by representative network and computing environments in which such embodiments and/or features can be implemented.

Locating and Executing Objects in a Distributed Network

By way of further description with respect to one or more non-limiting ways to provide access to live objects from a Uniform Resource Identifier (URI) and to provide distributed execution of the objects, a block diagram of an exemplary computing system is illustrated generally by FIG. 1. The computing system includes an environment 100, which can be a distributed network or a distributed directory. In some aspects, the environment 100 is associated with cloud computing (or simply "cloud"), wherein an end-user (e.g., client device) is not aware of the physical location and configuration of the system that delivers services, distributed objects, and so forth. In an example, an abstraction layer, located in the cloud, can receive instructions from a client device. Based on the instructions, the abstraction layer can interact with one or more objects on behalf of the client device. Further, the abstraction layer can interact with the client device on behalf of the object. Thus, the abstraction layer can hide the implementation details from the client device.

When a user desires a service or a distributed object, which can be located in the environment 100, an object request 110 is received. For example, each distributed object can have a relative URI or an absolute URI. For example, a first distributed object can have a first URI, a second distributed object can have a second URI, and so forth. The URI can be assigned to the object when the object is created and can be retained in a distributed object directory, according to an aspect. In accordance with some aspects, the object request includes a reference to the URI. Thus, when a user desires to access a distributed object, the user enters the URI of the object. According to some aspects, multiple object requests can be received from a single user or from different users. The multiple objects requests can be for different objects, thus, the multiple object requests can reference different URIs. The system is configured to execute the multiple object requests, such as though the abstraction layer, according to an aspect. Further, single instances of multiple instances of the object can exist at substantially the same time.

In some aspects, a URI assigned to an object can be anonymous such that there are no security features (e.g., password, security credentials, and so forth) associated with the object. Thus, any client that can access the network and that is aware of the URI can access the object and utilize features associated with the object. According to some aspects, security features can be established for an object. In this case, a user attempts to access the object by entering the URI and, in addition, inputs various credentials (e.g., user id/password pair, biometrics, or other security parameters). If the credentials match the credentials assigned to the object, the user is authorized and access to the object is granted. If the credentials do not match, access to the object is denied.

Based on the object request 110 (e.g., entry of the URI and, in some cases, security parameters), an object manager component 120 is configured to access an object. In accordance with some aspects, the object manager component 120 accesses the object data 130. For example, the object manager component 120 can obtain object data 130 from an object server. In accordance with some aspects, the object manager component 120 is not aware of the actual location of the object. For example, the object can be located on different devices (or different clouds) that interface with the distributed network. In an aspect, the object manager component 120 is configured to connect to a live instance of the object (or another object or sub-object associated with the object).

The object data 130 is provided to an object processing component 140 that is configured to interact remotely with the object. For example, the object processing component 140 can be configured to execute methods on the object located in the environment 100. Further, the object processing component 140 can be configured to allow the object to be utilized remotely (in the cloud or on the distributed object directory (object namespace)) or locally (on the client device). If the object is utilized remotely, any changes to the object are automatically saved in the cloud (e.g., in real-time, at about the same time as the change is made, and so forth). In some aspects, the object processing component 140 is configured to interact with the object anonymously.

If the object is utilized locally, any changes to the object are saved to the cloud either manually (e.g., by the user) or automatically based on other criteria. For example, if the user interacts with the object locally, an abstraction layer can request that the object be saved to the cloud after certain criteria has been met (e.g., after a specified time interface, upon notification of a change to the object, and so forth). The manual and/or automatic saving of the object to the cloud allows the updated version of the object to be accessed by the user (or a different user) when the URI associated with the object is requested (at a later time).

An advantage of the disclosed aspects is that an object can be provided without special programming considerations. Thus, objects can live in the network and can take advantage of cloud computing. Further, an updated version (or most recent version) of an object can be accessed by different users/client devices, the same user/same client device, or the same user/different client device. For example, a user might interact with an object at a work computer. If the user interacted with the object remotely, the object is automatically saved in the cloud. If the user interacted with the object locally, the user might save the object to the cloud before leaving work for the day. In the evening, the user might decide to access the object again. Since a live version of the object has been saved in the cloud (e.g., automatically, manually), the user can access the object from a different device (e.g., a home computer) or the same device (e.g., a laptop used at both work and home).

In an embodiment, the object execution system illustrated by FIG. 1 can differ in operation from conventional object execution systems in order to provide additional benefits over those achievable by computing systems that employ conventional object execution systems. For instance, the object execution system disclosed herein can be applied locally and/or remotely in a distributed network or in the cloud.

Figure 2:
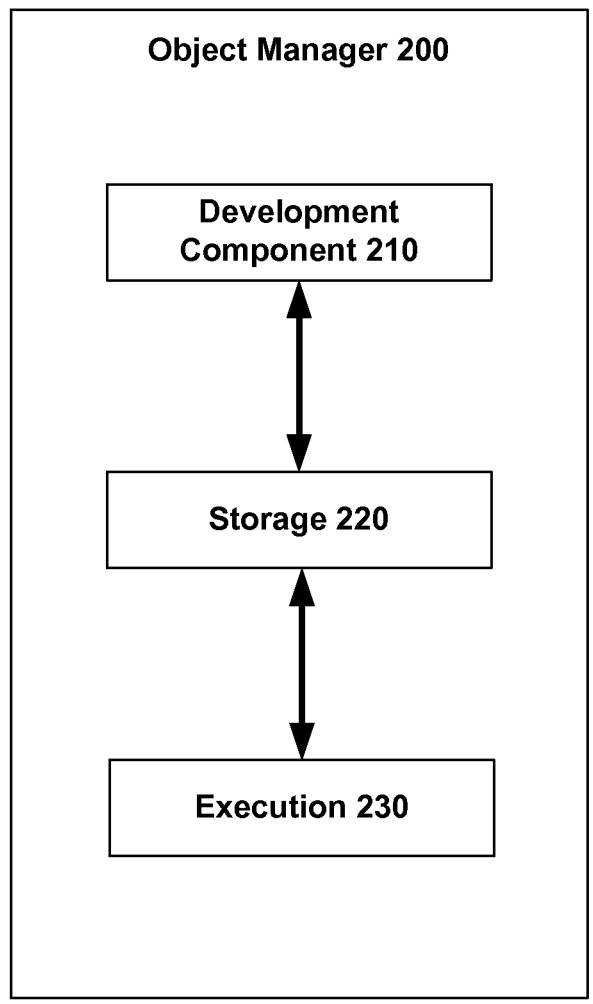
FIG. 2 is a block diagram showing an object manager component containing a development component, a storage component, and an execution component, according to an aspect.

Illustrating other aspects, FIG. 2 is a block diagram showing an object manager component 200 containing a development component 210, a storage component 220, and an execution component 230, according to an aspect. The object manager component 200 is configured to create the object and assign a URI to the object. In one embodiment, development component 210 is configured write an object to a web-service. For example, a developer can define an object "foo" utilizing normal programming (e.g., developer is not aware that the object will be used in the cloud). After defining the object "foo", the developer can publish the object by calling a web-service and executing a "write" procedure, which is configured to write the object to the web-service.

The storage component 220 is configured to retain or save the object in a database associated with the web-service. Continuing the above example, at about the same time as the object is written to the web-service, a path is assigned to the object. For example, the path can include a name of the object, such as "Fred". Thus, "foo" is the actual object instance and the object name is "Fred". The object name allows the object to exist as a named object in the cloud. For example, the developer might create the object locally, however, once the object is saved to the web-service, the object is in the cloud and can be retained in a database, for example. In an aspect, saving the object comprises assigning a URI to the object, wherein the URI is universal (e.g., can be utilized by more than one user, can be utilized at multiple locations, and so forth). In some aspects, the URI can provide a single instance or multiple instances of the object to exist at substantially the same time.

The execution component 230 is configured to execute (e.g., run) the object based on receipt of a request directed to the URI. For example, when the object "Fred" is to be executed, a request is received and the object is executed at the same URI. Thus, a developer can create an object without complex remote procedures and without concern for the infrastructure of the system.

Figure 3:
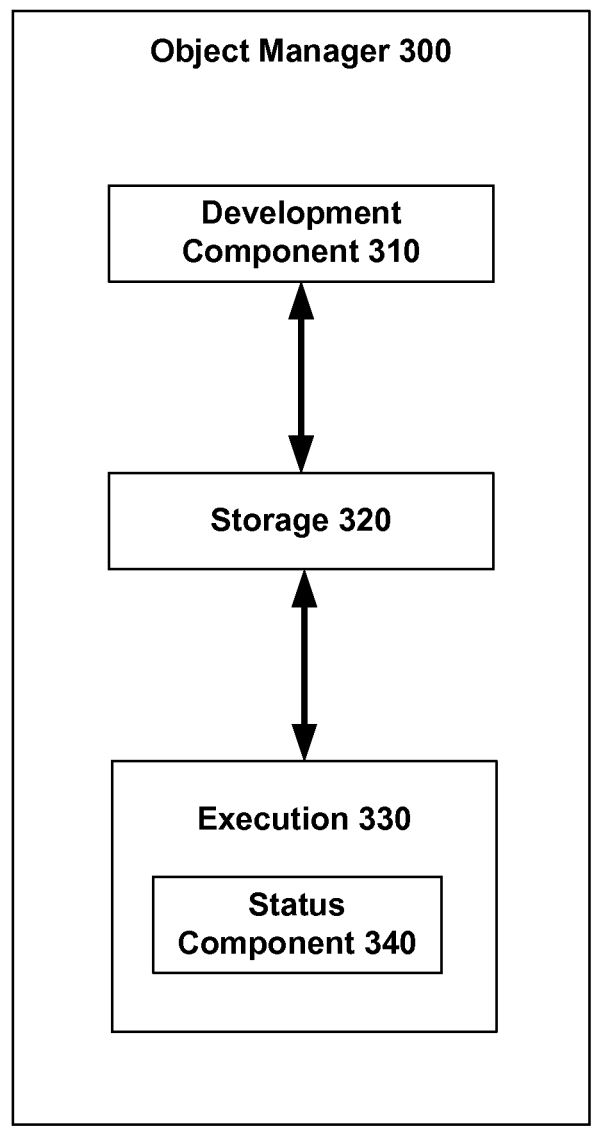
FIG. 3 illustrates another aspect of object manager component, according to an aspect.

FIG. 3 illustrates another aspect of object manager component 300, according to an aspect. Object manager component 300 can comprise a development component 310 that is configured to create an object and a storage component 320 that is configured to retain the object in the cloud. The object can be agnostic to remote procedures.

Also included in object manager component 300 is an execution component 330 configured to selectively grant access to the object as a function of a request for a URI. The URI can be a relative URI or an absolute URI. In an aspect, execution component 330 is configured to selectively grant access to the object to one or more users and/or one or more client devices. For example, a user is utilizing an object at work. Later in the evening, the user wants to interact with the object at home, using a different client device. The execution component 330 is configured to selectively grant the user access to the object, although the client devices are different. In another aspect, different users (and different client devices) can be provided access to the object in the cloud.

To facilitate such access, execution component 330 can be configured to execute the object based on a request from a first device. A status component 340 is configured to ascertain whether the first device is still connected to the object or has disconnected from the object. The determination can be made based on an active session on the client machine or based on other criteria (e.g., a time-out status, wherein if an input is not received in a specified time, the client device is automatically timed out and access to the object is disconnected). If the first device is still connected to the object, another device can be denied access to the object. Alternatively, the other device can be provided with one of multiple instances of the object.

If it is determined that the client is no longer connected to the object, storage component 320 is configured to retain a modified version (e.g., first version) of the object. In some aspects, storage component 320 can be configured to retain an original version of the object and/or subsequent (e.g., modified) versions of the object. In some aspects, the saved version of the object can be one instance of multiple instances of the object.

Object manager component 300 can receive a second request from the first device or from a second device. Based on the second request, execution component 330 is configured to execute the modified version of the object (or a subsequent version of the object).

Figure 4:
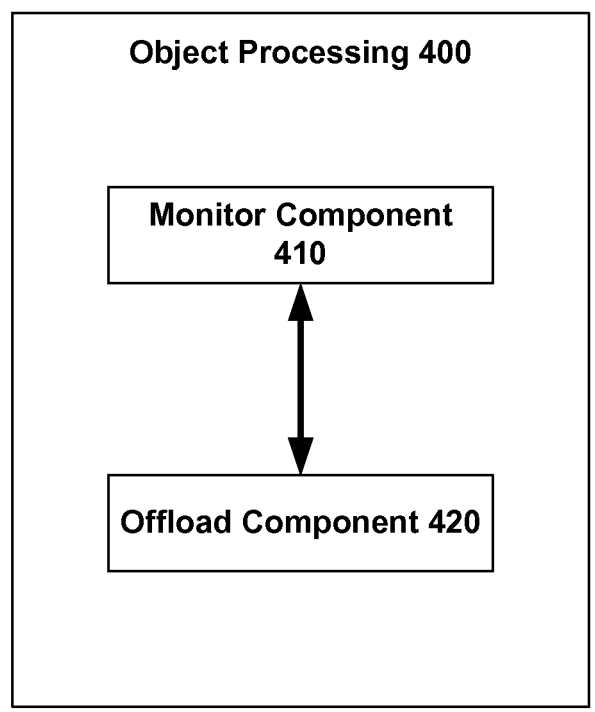
FIG. 4 illustrates an object processing component containing an monitor component and an offload component, according to an aspect.

FIG. 4 illustrates an object processing component 400 containing a monitor component 410 and an offload component 420, according to an aspect. The object processing component 400 is configured to interact remotely with the object. In an aspect, the object processing component 400 interacts indirectly with the object through an abstraction layer. In some aspects, the object processing component 400 is configured to indirectly interact with at least a second object that performs at least one function on behalf of the object. The object can be agnostic to remote procedures.

The monitor component 410 is configured to receive real-time feedback of a condition of the object. For example, an object can be executed locally on a client device and saved to the cloud so that the object can be used on a different client device (or on the same client device at another time). If the object is not saved to the cloud, the most recent version of the object will not be available through the URI. However, if the object is executed in the cloud, the most recent version of the object is automatically retained in the cloud. Thus, if the object is executed in the cloud (or when a local copy of the object is saved to the cloud), the monitor component 410 is configured to obtain the real-time feedback (in the case of remote execution) or updated feedback (in the case of local execution).

The offload component 420 is configured to indirectly interact with at least a second object (e.g., a sub-object) that performs at least one function on behalf of the object. Since the object is in a distributed network, the exact location of the object might not be known. Further, the object can have sub-objects or multiple parts that can be located in different places within the distributed network (e.g., cloud, Internet, and so forth). For example, a live object can be executed that can connect to one or more other executing objects, sub-objects, multiple parts, components, and so forth (e.g., distributed portion). Each portion of the distributed portion (as well as the object) can be located in different systems, which can provide interoperability.

Further the object, in the cloud, can be executed in a first machine (or first cloud) and at least one portion of the distributed portion can be executed in a second machine (or in a second cloud), and so forth. According to an aspect, if a machine or cloud does not have the capability to execute a method (e.g., due to processing constraints) the object can be configured to offload at least a portion of its functionality to a distributed object even though the object processing component 400 is unaware of the existence of the distributed object. Thus, at least a portion of the functionality is executed on a different machine or cloud (e.g., distributed portion), even though the object was not originally created with this capability. The client device is not aware of the offloading or distributed portion.

Further, the disclosed aspects provide distributed execution of a single object. Thus, if the object is overused, it can be scaled out to different machines or clouds quickly. Additionally, analytics can be provided that can anticipate whether or not functionality of an object should be offloaded.

The following example illustrates how an object is placed into the network. The example uses a typical shopping cart scenario with a distinction, the shopping cart is not a website specific application code but instead is a "cloud object" that exists independently from the website. Note that any object (such as a .NET object) can be used with the disclosed aspects, whether that object understands remote procedure calls or not, which is an advantage of the disclosed aspects.

The user, through a website, accesses the shopping cart "in the cloud" and therefore could access the same cart from anywhere on the web and not just a single website. In an aspect, the user can input a URI and access the shopping cart using the URI.

For example, a user virtually visits a web-based book store and buys a book and places the book into a personal shopping cart. Then the user goes to a web-based electronic store and buys a video game and adds the video game to the same personal shopping cart. Next, the user visits a web-based home improvement store and buys a lawnmower, which is also placed in the personal shopping cart. The shopping cart is a "cloud" object and belongs to the user, not the businesses per se. Thus, the user can leave one website and visit another website from a different computer or device without losing the cart items. When the user desires to checks out (e.g., purchase the items), the transactions are sent to the appropriate businesses to complete the transactions and independently ship the merchandise.

It is to be understood that the above example is hypothetical and logistical issues with respect to interacting with each of the checkout processes (e.g., businesses) is to be enabled on an individual basis as a function of the different entities associated with each of the check out processes. The disclosed aspects allow for the implementation of the personal shopping cart "in the cloud", which is not addressed by conventional systems. Further, although the disclosed aspects are discussed with reference to a distributed shopping scenario, the disclosed aspects can be utilized with other scenarios than those discussed herein.

The following is an example of the disclosed aspects where the object is not executed remotely but instead is downloaded to the calling machine (e.g., client device) and executed locally.

This is shown in order to contrast it with the remote execution aspects described herein.

```
ObjectNamespace directory = ObjectNameSpace.Connect( );
ShoppingCartshoppingCart = newShoppingCart ( );
Directory.Write(
    "/provider/customer/<cusomterID>/MySoftwareBasket",
    shoppingCart
);
```

The above example creates a shopping cart object locally (on the client device) and writes into the object namespace underneath a user's personal directory. In this example, the customer is named by a customer ID. The shopping cart object is stored with the name "MySoftwareBasket" to imply the customer is buying software online. This example is basically writing data.

Now that there is a shopping cart object in the network, an application can access it by calling one of two directory methods, which are "Bind" and "Activate". Bind connects to an existing instance of an object and can execute in one of two ways, which are locally (make local copy) or remotely (connect to remote copy). Activate is used to create a new remote instance and load it into the network. Activate loads the object into a remote process in the cloud.

Binding to the object in the directory using the local option causes the object's data to be copied to the local machine and a local instance is created. All calls to the object are performed locally (e.g., in process). In this scenario, the object is to be saved back into the namespace in order for the changes to take effect.

Figure 5:
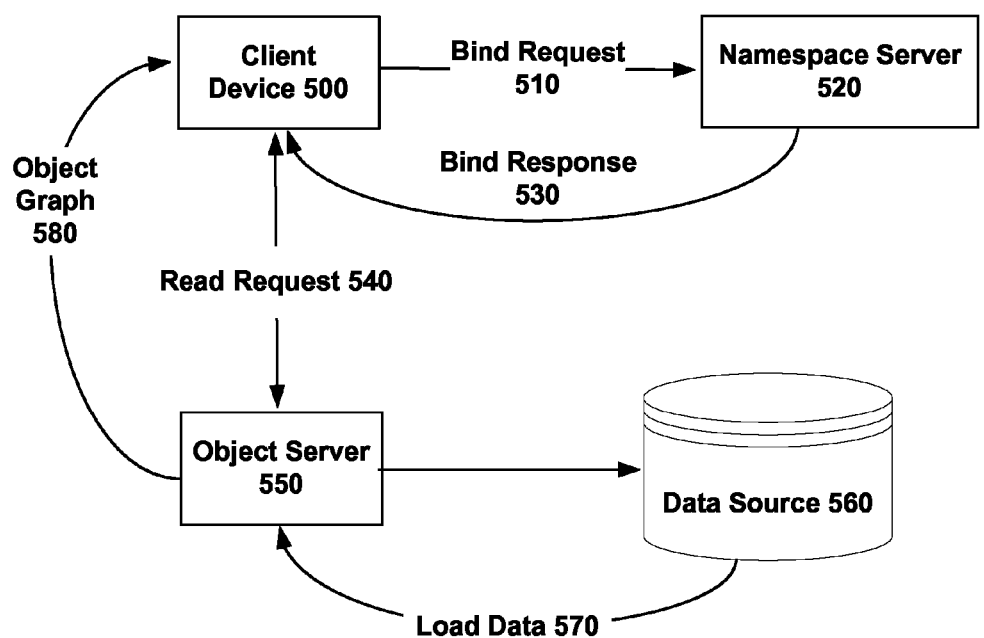
FIG. 5 illustrates a non-limiting flow diagram of a local bind process, according to an aspect.

FIG. 5 illustrates a non-limiting flow diagram of a local bind process, according to an aspect. A client device 500 sends a bind request 510 to a name space server 520. The name space server 520 replies with a bind response 530, which can include a namespace record. The client device 500 sends a read request 540, which can include an object id, to an object server 550. The object server 550 interacts with a data source 560 to obtain object data 570, which is loaded on the object server 550. The object server 550 provides the object graph 580 to the client device 500.

The following example shows how this can appear programmatically. This all happens on the client device after their object is downloaded using the Bind method.

```
ShoppingCart shoppingCart = directory.Bind(
    "/provider/customer/<customerID>/MySoftwareBasket",
    BindOptions.Locally
);
shopingCart.Add(product);
directory.Write (shoppingCart);
```

The following example is similar to the above example with one exception, which is that the bind option specifies a remote binding. In this example, the real object is not downloaded to the client but rather a proxy is created on the client.

Figure 6:
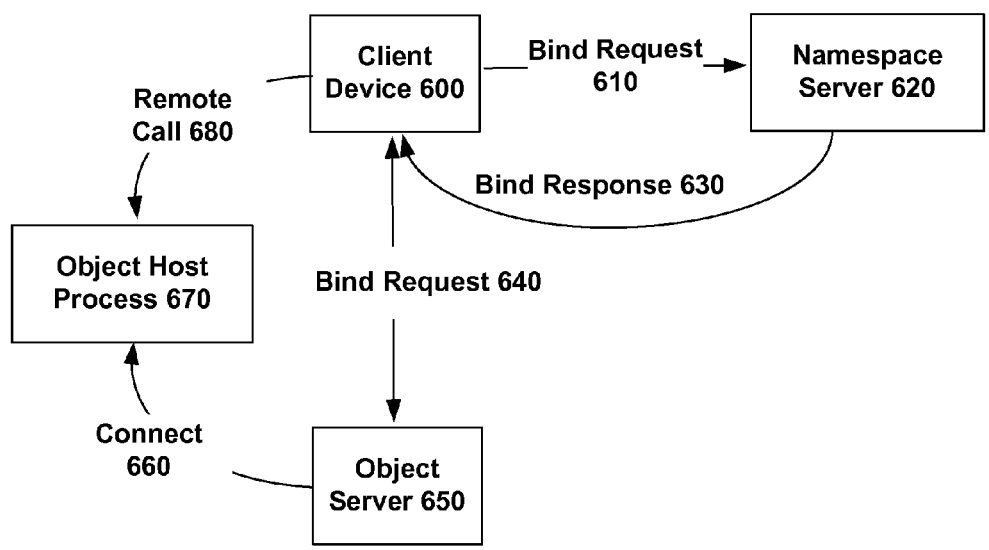
FIG. 6 illustrates a non-limiting flow diagram of a remote bind process, according to an aspect.

FIG. 6 illustrates a non-limiting flow diagram of a remote bind process, according to an aspect. A client device 600 sends a bind request 610 to a namespace server 620, which replies with a bind response 630 that can include the namespace record. The client device 600 sends a bind request 640, which includes a graph ID (or object id), to an object server 650. The object server 650 connects 660 to an object host process 670. The client device 600 makes a remote call 680 to the object through the object host process 670.

The call to Add is performed remotely and the call to Write instructs the remote process to perform the write of the object's data to the database.

```
ShoppingCart shoppingCart = directory.Bind (
    "/provider/customers/<customerID>/MySoftwareBasket",
    BindOptions.Remotely
);
Product product = new Product ("Program Name");
shoppingCart.Add (product);
directory.Write (shoppingCart);
```

Figure 7:
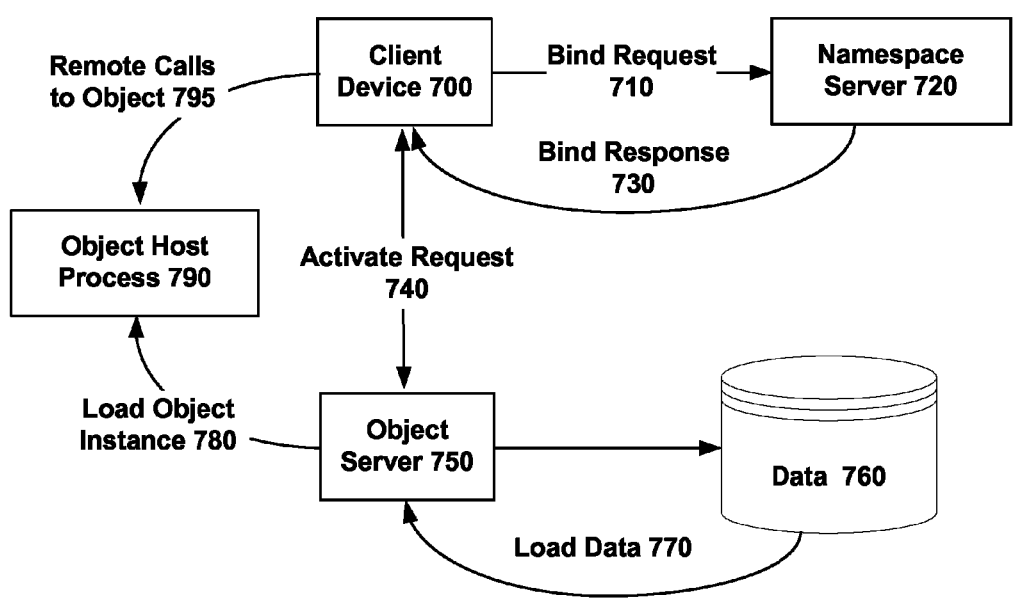
FIG. 7 illustrates a non-limiting flow diagram of an activate process, according to an aspect.

An object can be activated and bound in one call. In this scenario, a new instance is created and a proxy is returned. FIG. 7 illustrates a non-limiting flow diagram of an activate process, according to an aspect. Illustrated is a client device 700 that transmits a bind request 710 to a namespace server 720. The namespace server 720 replies with a bind response 730, which includes the namespace record.

An activate request 740 that includes the object id is sent from the client device 700 to an object server 750. The object server 750 accesses a data source 760 and data is loaded 770 to the object server 750. The object server 750 loads the object instance 780 into an object host process 790. The client device 700 makes remote calls to the object 795.

The following code illustrates how this might appear programmatically.

```
ShoppingCart shoppingCart = directory.Activate(
    "/provider/customers/<customerID>/MySoftwareBasket"
);
Product product = new Product("Program Name");
shoppingCart.Add(product);
directory.Write(shoppingCart);
```

With activate, the object is running in the cloud as a single instance. The client only interacts with the object remotely, which is transparent to the client. The client can even disconnect and reconnect later to the same running object from the same machine or from a different machine.

In the activate case, the call to Add is sent to the object although the object does not know the call is remote. This is an advantage of the disclosed aspects because conventional systems that provide remoting and activation technologies make the developer and object implementation know this detail.

Thus, the disclosed aspects takes care of the remote procedure calls for the object. The examples thus far mostly deal with the data of an object and whether or not the calls are local or remote. There are methods on objects that invoke a procedure or process against the data. For example, in the following it will be assumed that there is a Checkout method on the shopping cart object. The following example shows how a remote call to the checkout method might appear:

```
ShoppingCart shoppingCart = directory.Activate(
    "/provider/customers/<customerID>/MySoftwareBasket"
);
```

```
Product product = new Product ("Program Name");
shoppingCart.Add (product);
shoppingCart.Checkout ( ) ;
directory.Write(shoppingCart);
```

This example calls the remote shopping cart twice: once to add the product and a second to start the checkout process. Note the call to Write can be performed in any order. It simply indicates that the state is to be written to the database.

Once there is a connection to a remote instance, the method can be invoked remotely. The technology of the disclosed aspects performs this transparently, however, a traditional remote procedure call technology is not utilized since in those, the object itself is to be aware of remoting. Instead, the running object is hosted in a host process and an invoke request is sent to the service, passing the various parameters.

Additionally one object instance running in the cloud is allowed to send or receive messages to and from any other instance of a running object. This is similar to method invocation, however, the methods are special. In this scenario, the object provides implementation logic to handle message passing.

```
publicinterface ISendMessage
{
void SendMessage(
GraphID recipient,
Message message
      );
}
publicinterface IRecieveMessage
{
void ReceiveMessage (
GraphID sender,
       Message message
       );
}
Publicinterface ISendReceiveMessage : ISendMessage,
IReceiveMessage
{
Message SendReceiveMessage (
GraphID recipient,
);
}
```

A class may implement ISendMessage for sending only, IRecieveMessage for receiving only, or ISendReceiveMessage to send only, receive only, or send and receive in a single operation. The GraphId is the address of the running object in the distributed namespace. Each object in the namespace has its own ID. In accordance with some aspects, the ID is a 16 byte ID, however other lengths can be utilized. After performing the above, objects in the cloud can communicate with each other through a defined messaging contract or through the classes' native methods.

Figure 8:
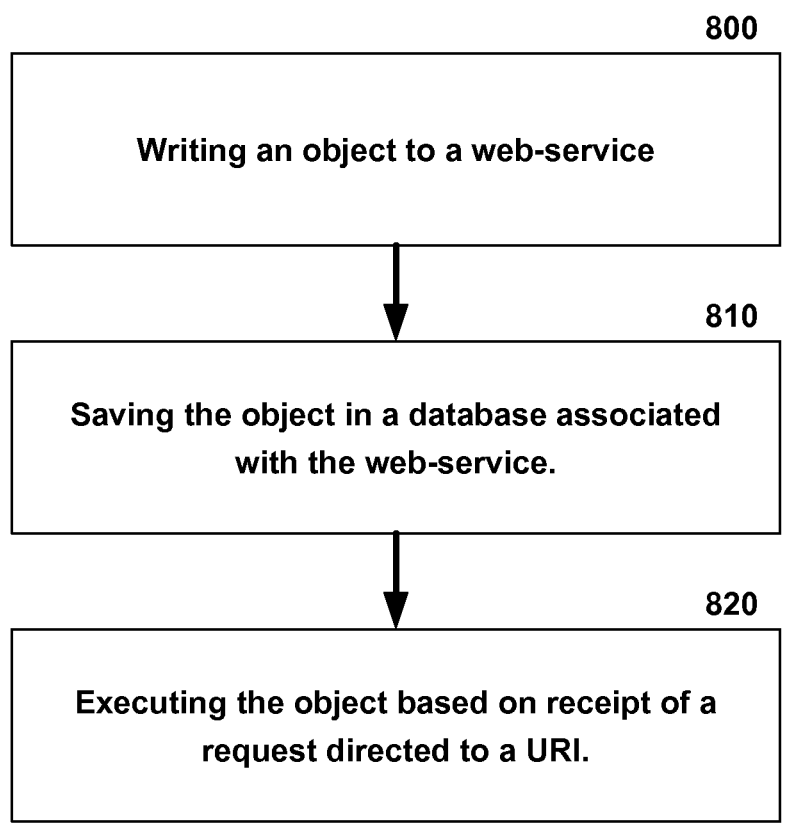
FIG. 8 is a flow diagram illustrating an exemplary non-liming process for interacting with a live object, according to an aspect.

FIG. 8 is a flow diagram illustrating an exemplary non-liming process for interacting with a live object, according to an aspect. At 800, an object is written to a web-service. At 810, the object is saved in a database associated with the web-service. In an aspect, saving the object in the database can include assigning a URI to the object. The URI can be universal. For example, the object can be used by anyone aware of the URI.

At 820, the object is executed based on receipt of a request directed to a URI. In an aspect, the object can be executed by a first device and saved (e.g., in the cloud). At a later time, the saved version of the object can be executed by a second device. For example, at least one change to the object can be processed and the at least one change can be saved in a database associated with the web-service. The request and the change can be received from a first device. Further, according to an aspect, a second request can be received from a second device and the object with the at least one change (e.g., the saved version of the object) can be presented to the second device. In an aspect, executing the object comprises interacting with at least a second object, wherein the second object is associated with the object.

Figure 9:
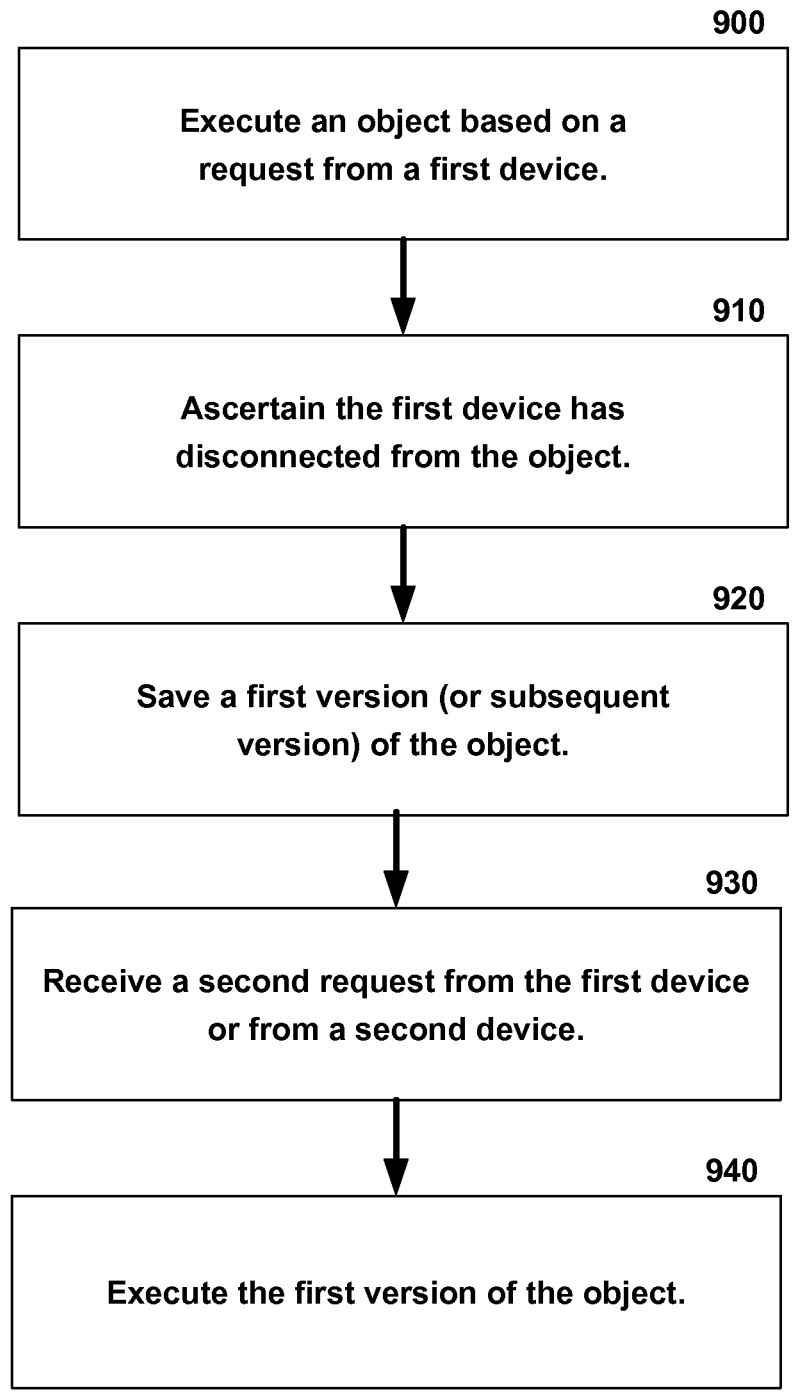
FIG. 9 is a flow diagram illustrating an exemplary non-limiting process for allowing multiple devices (or a single device) to interact with a live version of the object, in accordance with an aspect.

FIG. 9 is a flow diagram illustrating an exemplary non-limiting process for allowing multiple devices (or a single device) to interact with a live version of the object, in accordance with an aspect. At 900, an object is executed based on a request from a first device. The request can be directed to a URI associated with a live instance of an object. At 910, it is determined that the first device has disconnected from the object. For example, an explicit notification can be received from the first device indicating that the first device is leaving the URI (e.g., a live session is terminated). However, in some aspects, the determination can be made based on an inference of data (e.g., the client device is not responding, a time out period has elapsed, and so forth).

Based on the disconnection, a first version (or subsequent version) of the object is saved, at 920, as a modified version. In some aspects, multiple versions of the object are maintained. At 930, a second request is received from the first device or from a second device. Based on the second request, at 940, the first version (or subsequent version) of the object is executed. Subsequent modifications to the object can be retained, such as in a storage media.

Figure 10:
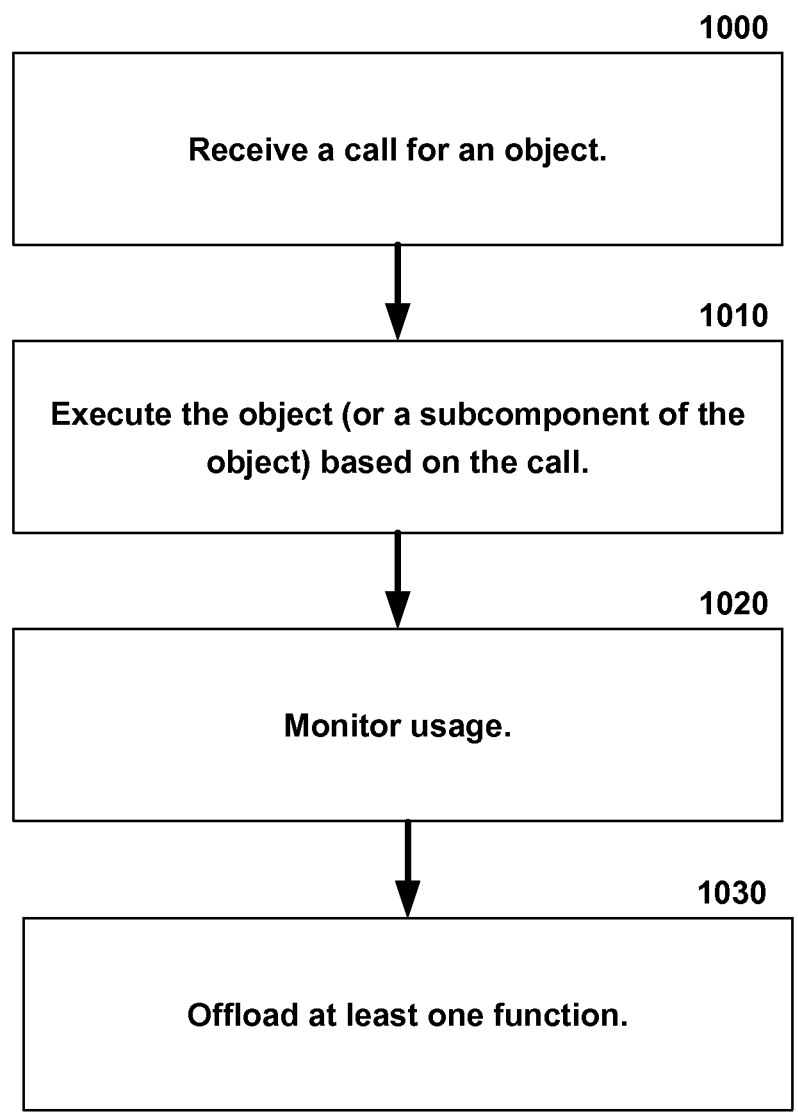
FIG. 10 is a flow diagram illustrating an exemplary non-liming process for interacting with a live object, according to an aspect.

FIG. 10 is a flow diagram illustrating an exemplary non-liming process for interacting with a live object, according to an aspect. At 1000, a call for an object is received. The object can comprise a first sub-object and a second sub-object (or more sub-objects). At 1010, at least one of the object, the first sub-object, and the second sub-object (or subcomponent) is executed as a function of the call.

In an aspect, the execution includes moving at least a portion of the object during the execution. In another aspect, the execution includes executing the first sub-object in a first machine and the second sub-object in the second machine. In a further aspect, the execution comprises offloading at least one function of the object to the first sub-object or the second sub-object. For example, after the object is executed, the use of the object (or a sub-object) is monitored, at 1020. Based on the monitoring, a function of at least one of the object (or a sub-object) is offloaded, at 1030.

Exemplary Networked and Distributed Environments

One of ordinary skill in the art can appreciate that the various embodiments of the object execution systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the object creation and execution mechanisms as described for various embodiments of the subject disclosure.

Figure 11:
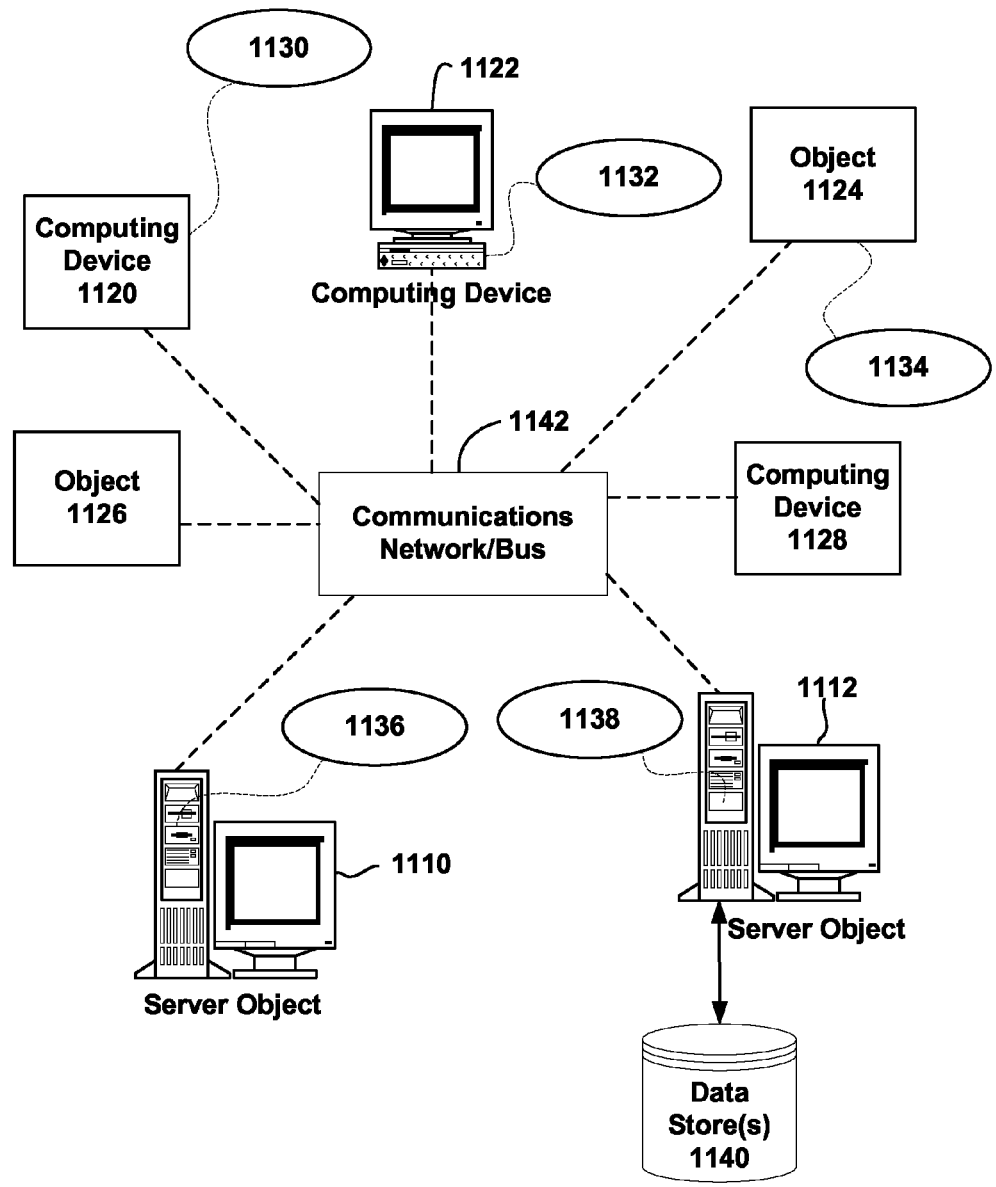
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the object execution techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the object execution systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to perform object creation and execution in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
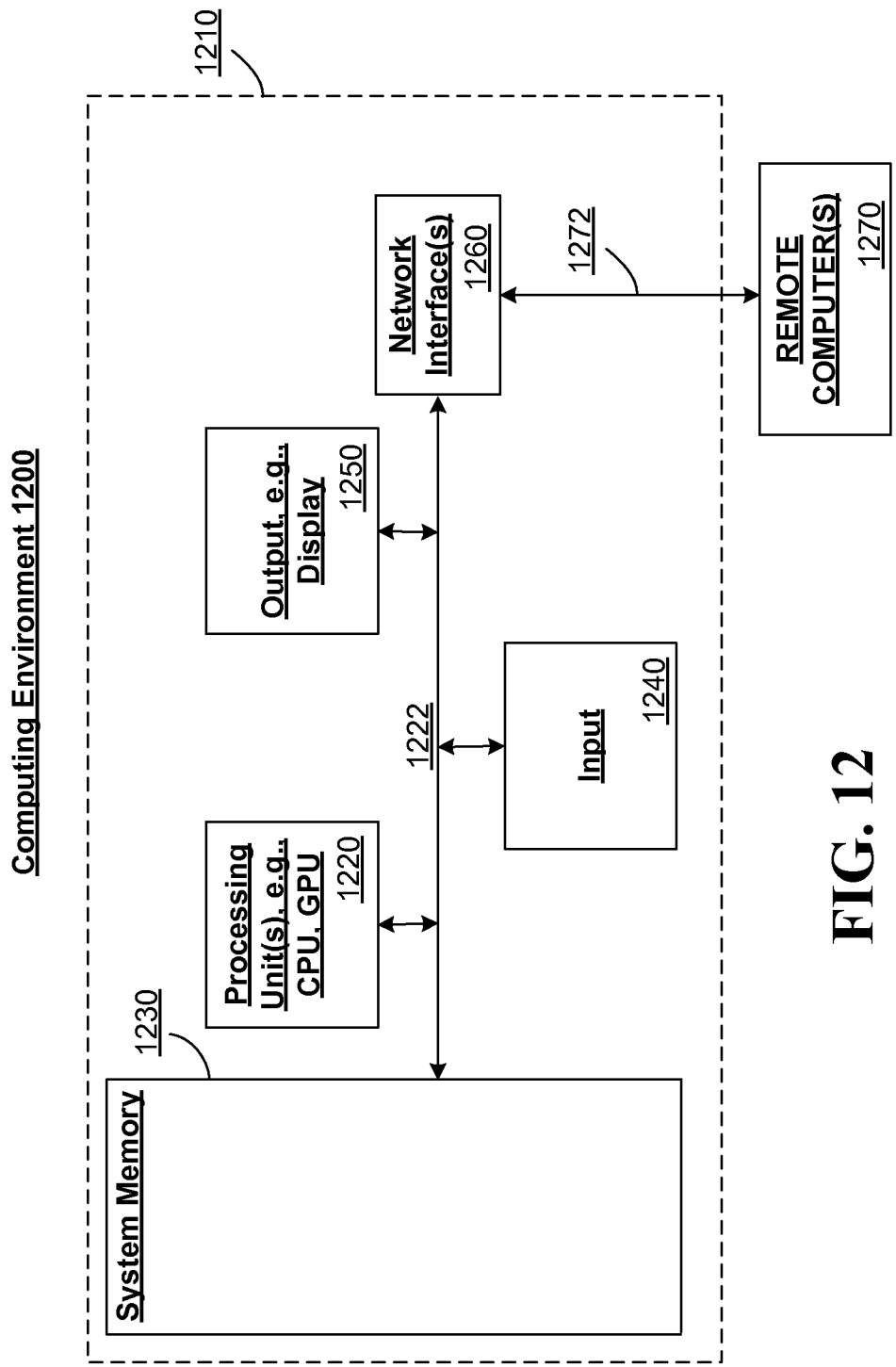
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing system environment 1200 be interpreted as having any dependency or requirement relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data. According to a further example, computer 1210 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections, such as network interfaces 1260, to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A system implemented on a client device, comprising:
   at least one processing unit;
   an object manager component implemented by the at least one processing unit and configured to access a distributed object based on a Uniform Resource Identifier (URI) associated with the distributed object, wherein the distributed object is agnostic to remote procedures; and
   an object processing component implemented by the at least one processing unit and configured to interact remotely with the distributed object, the remote interaction taking place over a distributed network, and the distributed object being configured to:
   perform a first function of the distributed object, and
   offload at least a portion of its functionality to a second distributed object, the at least a portion including a second function of the distributed object, the object processing component being unaware of an existence of the second distributed object.

2. The system of claim 1, wherein the object manager component is configured to connect to a live instance of the distributed object.

3. The system of claim 1, wherein the object processing component is configured to receive real-time feedback of a condition of the distributed object.

4. The system of claim 1, wherein the object processing component is configured to indirectly interact with at least the second object that performs at least one function on behalf of the distributed object.

5. The system of claim 1, wherein the object processing component is configured to interact with the distributed object anonymously.

6. The system of claim 1, wherein the URI is a relative URI or an absolute URI.

7. The system of claim 1, further comprising an abstraction layer configured to communicate with the client device on behalf of the distributed object and to communicate with the distributed object on behalf of the client device.

8. The system of claim 1, wherein the object processing component is configured to remotely execute the distributed object.

9. A method, comprising:
   accessing, by a processing unit on a client device, a distributed object based on a request for a Uniform Resource Identifier (URI) received from a client device, the distributed object being enabled to be utilized irrespective of remote procedure semantics; and
   interacting remotely, by the processing unit on the client device, with the distributed object, the remote interaction taking place over a distributed network,
   the distributed object performing a first function of the distributed object and offloading at least a portion of its functionality, that includes a second function of the distributed object, to a second distributed object, the processing unit on the client device being unaware of an existence of the second distributed object.

10. The method of claim 9, wherein the accessing connects to a live instance of the distributed object.

11. The method of claim 9, wherein the interacting receives real-time feedback of a condition of the distributed object.

12. The method of claim 9, wherein the accessing indirectly interacts with at least the second object that performs at least one function on behalf of the distributed object.

13. The method of claim 9, wherein the accessing interacts with the distributed object anonymously.

14. The method of claim 9, wherein the URI is a relative URI or an absolute URI.

15. The method of claim 9, further comprising communicating with the client device on behalf of the distributed object and communicating with the distributed object on behalf of the client device.

16. A system implemented on a client device, comprising:
   at least one processing unit;
   an object manager component implemented by the at least one processing unit and configured to access a distributed object based on a Uniform Resource Identifier (URI) associated with the distributed object, wherein the distributed object is agnostic to remote procedures; and
   an object processing component implemented by the at least one processing unit and configured to execute a method of the distributed object remotely, the execution taking place over a distributed network,
   the distributed object being configured to:
   perform a first function of the distributed object, and
   offload at least a portion of its functionality to a second distributed object, the at least a portion including a second function of the distributed object, the object processing component being unaware of an existence of the second distributed object.

17. The system of claim 16, wherein the object manager component is configured to connect to a live instance of the distributed object.

18. The system of claim 16, wherein the object processing component is configured to receive real-time feedback of a condition of the distributed object.

19. The system of claim 16, wherein the object processing component is configured to interact with the distributed object anonymously.

20. The system of claim 16, wherein the URI is a relative URI or an absolute URI.

* * * * *